US011050136B2

(12) United States Patent
Jung et al.

(10) Patent No.: US 11,050,136 B2
(45) Date of Patent: Jun. 29, 2021

(54) ELECTRONIC DEVICE COMPRISING ANTENNA

(71) Applicant: Samsung Electronics Co., Ltd., Gyeonggi-do (KR)

(72) Inventors: Sang Min Jung, Gyeonggi-do (KR); Yong Sang Yun, Gyeonggi-do (KR)

(73) Assignee: Samsung Electronics Co., Ltd

( * ) Notice: Subject to any disclaimer, the term of this patent is extended or adjusted under 35 U.S.C. 154(b) by 94 days.

(21) Appl. No.: 16/334,199

(22) PCT Filed: Jul. 28, 2017

(86) PCT No.: PCT/KR2017/008179
§ 371 (c)(1),
(2) Date: Mar. 18, 2019

(87) PCT Pub. No.: WO2018/052188
PCT Pub. Date: Mar. 22, 2018

(65) Prior Publication Data
US 2020/0028241 A1  Jan. 23, 2020

(30) Foreign Application Priority Data
Sep. 19, 2016  (KR) .................. 10-2016-0119045

(51) Int. Cl.
*H01Q 1/24* (2006.01)
*H01Q 5/307* (2015.01)

(52) U.S. Cl.
CPC .............. *H01Q 1/24* (2013.01); *H01Q 5/307* (2015.01)

(58) Field of Classification Search
CPC .. H01Q 1/24; H01Q 1/44; H01Q 1/48; H01Q 1/243; H01Q 5/307; H04M 1/02
See application file for complete search history.

(56) References Cited

U.S. PATENT DOCUMENTS

| 7,688,273 B2 | 3/2010 | Montgomery et al. |
| 7,688,275 B2 | 3/2010 | Montgomery et al. |

(Continued)

FOREIGN PATENT DOCUMENTS

| KR | 1020100068480 | 6/2010 |
| KR | 1020120015352 | 2/2012 |

(Continued)

OTHER PUBLICATIONS

PCT/ISA/210 Search Report issued on PCT/KR2017/008179, pp. 7.
PCT/ISA/237 Written Opinion issued on PCT/KR2017/008179, pp. 6.

*Primary Examiner* — Awat M Salih
(74) *Attorney, Agent, or Firm* — The Farrell Law Firm, P.C.

(57) ABSTRACT

An electronic device according to an embodiment of the disclosure includes a first antenna element that includes at least a portion of a housing, a metal component that is disposed adjacent to the first antenna element within the housing, a second antenna element that is disposed adjacent to the metal component, and a communication circuit that supplies a power to the first antenna element and the second antenna element. The communication circuit may indirectly supply a power to the metal component through at least one of the first antenna element and the second antenna element, and the communication circuit may transmit/receive a signal in a specified frequency band through an electrical path that is formed by the first antenna element, the second antenna element, and the metal component. Moreover, various embodiment found through the disclosure are possible.

13 Claims, 9 Drawing Sheets

(56) References Cited

U.S. PATENT DOCUMENTS

| | | |
|---|---|---|
| 8,164,538 B2 | 4/2012 | Montgomery et al. |
| 8,344,956 B2 | 1/2013 | Montgomery et al. |
| 8,547,289 B2 | 10/2013 | Montgomery et al. |
| 8,618,988 B2 | 12/2013 | Febrega-Sanchez et al. |
| 8,723,743 B2 | 5/2014 | Montgomery et al. |
| 8,803,756 B2 | 8/2014 | Montgomery et al. |
| 8,866,691 B2 | 10/2014 | Montgomery et al. |
| 9,100,096 B2 | 8/2015 | Montgomery et al. |
| 9,190,726 B2 | 11/2015 | Montgomery et al. |
| 9,318,803 B2 | 4/2016 | Montgomery et al. |
| 9,337,548 B2 | 5/2016 | Montgomery et al. |
| 9,401,547 B2 | 7/2016 | Montgomery et al. |
| 9,652,073 B2 | 5/2017 | Lim et al. |
| 9,660,337 B2 | 5/2017 | Montgomery et al. |
| 9,680,514 B2 | 6/2017 | Montgomery et al. |
| 10,116,039 B2 | 10/2018 | Lee et al. |
| 2008/0258991 A1 | 10/2008 | Montgomery et al. |
| 2008/0278405 A1 | 11/2008 | Montgomery et al. |
| 2009/0091508 A1 | 4/2009 | Fabrega-Sanchez et al. |
| 2010/0265146 A1 | 10/2010 | Montgomery et al. |
| 2011/0021139 A1* | 1/2011 | Montgomery ......... H01Q 21/29 455/41.1 |
| 2011/0080332 A1 | 4/2011 | Montgomery et al. |
| 2012/0299792 A1 | 11/2012 | Montgomery et al. |
| 2013/0157592 A1 | 6/2013 | Montgomery et al. |
| 2014/0062819 A1 | 3/2014 | Montgomery et al. |
| 2014/0206298 A1 | 7/2014 | Montgomery et al. |
| 2014/0340269 A1 | 11/2014 | Montgomery et al. |
| 2014/0340274 A1 | 11/2014 | Montgomery et al. |
| 2015/0303590 A1 | 10/2015 | Montgomery et al. |
| 2016/0043477 A1 | 2/2016 | Montgomery et al. |
| 2016/0056530 A1 | 2/2016 | Lee et al. |
| 2016/0126614 A1 | 5/2016 | Lim et al. |
| 2016/0190684 A1 | 6/2016 | Montgomery et al. |
| 2016/0226546 A1 | 8/2016 | Montgomery et al. |

FOREIGN PATENT DOCUMENTS

| | | |
|---|---|---|
| KR | 1020120124686 | 11/2012 |
| KR | 1020130117585 | 10/2013 |
| KR | 1020140020670 | 2/2014 |
| KR | 101520223 | 5/2015 |
| KR | 1020160022074 | 2/2016 |
| KR | 1020160050467 | 5/2016 |

* cited by examiner

ELECTRONIC DEVICE COMPRISING ANTENNA

PRIORITY

This application is a National Phase Entry of PCT International Application No. PCT/KR2017/008179 which was filed on Jul. 28, 2017, and claims priority to Korean Patent Application No. 10-2016-0119045, which was filed on Sep. 19, 2016, the content of each of which is incorporated herein by reference.

TECHNICAL FIELD

Embodiments of the disclosure relate to a technology for preventing the reduction of performance of an antenna due to a metal component.

BACKGROUND ART

An electronic device, which is equipped with an antenna, such as a smartphone, a wearable device, or the like is widely supplied as mobile communication technologies develop. The electronic device may transmit/receive a message, a photo, a video, a music file, a game, and the like through the antenna.

The electronic device may transmit the photo, the video, the music file, and the like received through the antenna to any other electronic device, such as a computer or the like, through a metal component (e.g., a connector or a microphone). The electronic device may charge a battery through the metal component, and a user may listen to music by connecting an earphone to the metal component.

DISCLOSURE

Technical Problem

However, in the case where metal components such as a connector, a microphone, and the like are disposed adjacent to an antenna, performance of the antenna may be reduced. For example, a signal may be induced at a metal component, thereby reducing the efficiency of the antenna upon receiving a signal.

Embodiments of the disclosure provide an electronic device for solving the above-described problem and problems brought up in this specification.

Technical Solution

In accordance with an embodiment of the disclosure, an electronic device may include a first antenna element that includes at least a portion of a housing, a metal component that is disposed adjacent to the first antenna element within the housing, a second antenna element that is disposed adjacent to the metal component, and a communication circuit that supplies a power to the first antenna element and the second antenna element. The communication circuit may indirectly supply a power to the metal component through at least one of the first antenna element and the second antenna element, and the communication circuit may transmit/receive a signal in a specified frequency band through an electrical path that is formed by the first antenna element, the second antenna element, and the metal component.

In accordance with another embodiment of the disclosure, an electronic device may include a first antenna element that includes at least a portion of a housing, a metal component that is disposed adjacent to the first antenna element within the housing, a second antenna element that is disposed adjacent to the metal component, and a communication circuit that supplies a power to the first antenna element and the second antenna element. The communication circuit may indirectly supply a power to the metal component through at least one of the first antenna element and the second antenna element, may transmit/receive a signal in a first frequency band through an electrical path that is formed by the first antenna element, the second antenna element, and the metal component, and may change the electrical path to transmit/receive a signal of a second frequency band.

Advantageous Effects

According to various embodiments of the disclosure, the interference of radiation due to a metal component may decrease by disposing an auxiliary antenna radiator to be adjacent to the metal component.

Also, according to various embodiments of the disclosure, a multi-band antenna may be implemented by transmitting/receiving a signal through the auxiliary antenna radiator.

Besides, a variety of effects directly or indirectly understood through this disclosure may be provided.

MODE FOR INVENTION

Figure 1:
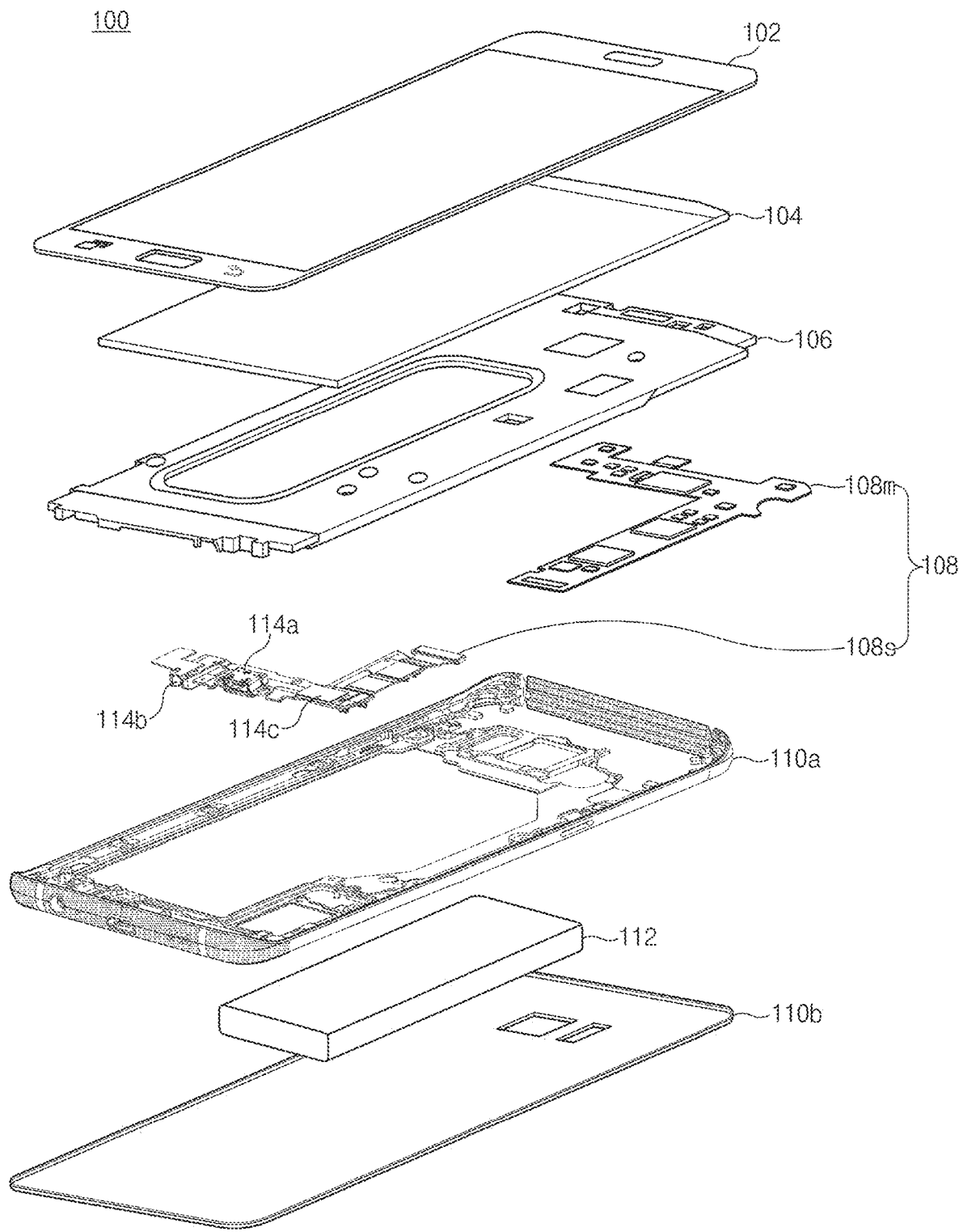
FIG. 1 is an exploded perspective view of an electronic device, according to an embodiment.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices.

According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

FIG. 1 is an exploded perspective view of an electronic device, according to an embodiment.

Referring to FIG. 1, an electronic device according to an embodiment may include a cover glass 102, a display 104, a printed circuit board (PCB) 108, a side housing 110a, a battery 112, and a rear housing 110b. According to an embodiment, the electronic device may not include some of the components illustrated in FIG. 1 or may further include one or more components not illustrated in FIG. 1.

The cover glass 102 may transmit a light generated by the display 104. Also, a user may touch a portion (e.g., a finger) of his/her body on the cover glass 102 to perform a touch (including a contact using an electronic pen). For example, the cover glass 102 may be formed of tempered glass, reinforced plastic, a flexible polymer material, or the like. The cover glass 102 may protect the display 104 and each component included in the electronic device from external impact. According to an embodiment, the cover glass 102 may be also referred to as a "glass window".

The display 104 may be disposed below the cover glass 102 and may also be disposed on/over a bracket 106. Also, the display 104 may be electrically connected with the PCB 108. The display 104 may output content (e.g., a text, an image, a video, an icon, a widget, a symbol, or the like) or may receive a touch input (e.g., a touch input, a gesture input, a hovering input, or the like) from a user. A metal sheet or a plate that is formed of copper (Cu) or graphite may be disposed on a rear surface of the display 104. The metal sheet may prevent an electromagnetic wave generated from a display panel and/or a touch panel from being provided to various electronic parts disposed on the PCB 108.

For example, the bracket 106 may be formed of magnesium alloy. The bracket 106 may be coupled with the display 104 and the PCB 108 to support the display 104 and the PCB 108 physically. According to an embodiment, the bracket 106 may include a through hole through which a part of an FPCB may pass. The through hole may be referenced as various terms such as a via hole, an opening, an opening part, and the like. According to an embodiment, a swelling gap may be formed in the bracket 106 in consideration of swelling of the battery 112.

The PCB 108 may include, for example, a first PCB 108m and a second PCB 108s. The first PCB 108m may be referenced as a main PCB, and the second PCB 108s may be referenced as a sub-PCB. According to an embodiment, the first PCB 108m and the second PCB 108s may be disposed below the bracket 106. The first PCB 108m and the second PCB 108s may be electrically connected to each other through a specified connector or a specified wire. The PCB 108 may be implemented with a rigid printed circuit board (PCB), for example. According to an embodiment, various electronic components, elements, printed circuits, and the like of an electronic device 100 may be mounted or arranged on the PCB 108.

A housing may include the side housing 110a and the rear housing 110b. The side housing 110a may be disposed below the PCB 108 and may accommodate each component of the electronic device. The side housing 110a may include a non-metal area that is not exposed to the outside of the electronic device and a metal area that is exposed through an outer side surface of the electronic device. For example, the non-metal area that is not exposed to the outside of the electronic device may be formed of a plastic injection-molding material. The metal area that is exposed through the outer side surface of the electronic device may be formed of metal. The exposed side area, which is formed of a metal material, may be also referenced as a metal bezel. According to an embodiment, at least a part of the metal bezel may be used as an antenna radiator for transmitting/receiving a signal of a specified frequency.

The side housing 110a may be coupled to a rear surface of the electronic device (e.g., to a lower surface of the side housing 110a). The rear housing 110b may be formed of tempered glass, a plastic injection-molding material, or the like. According to various embodiments, the rear housing 110b may be integrally formed with the side housing 110a or may be implemented to be removable by the user.

The battery 112 may convert chemical energy and electrical energy bidirectionally. For example, the battery 112 may convert chemical energy into electrical energy and may supply the electrical energy to the display 104 and various components or modules mounted on the PCB 108. Alternatively, the battery 112 may convert and store electrical energy supplied from the outside into chemical energy. According to an embodiment, a power management module for managing charging and discharging of the battery 112 may be included in the PCB 108.

Figure 2:
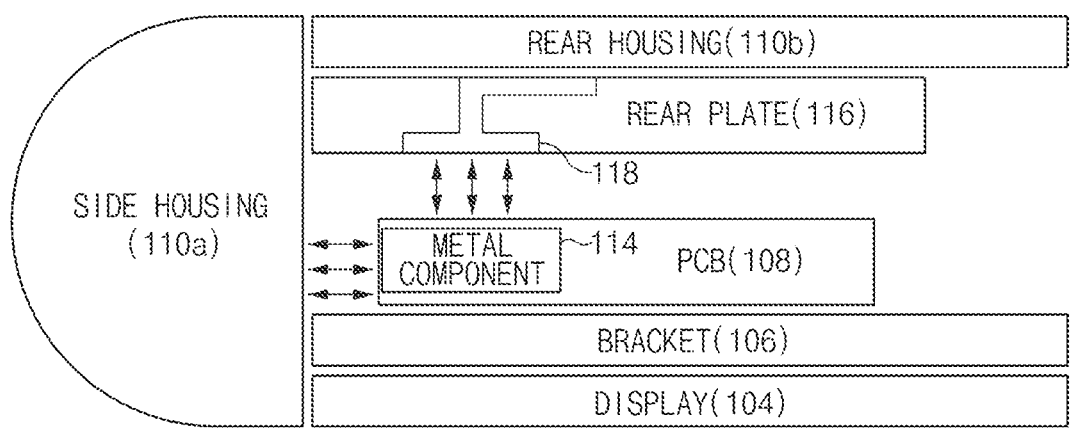
FIG. 2 illustrates a cross-sectional view of an electronic device, according to an embodiment.
Figure 3:
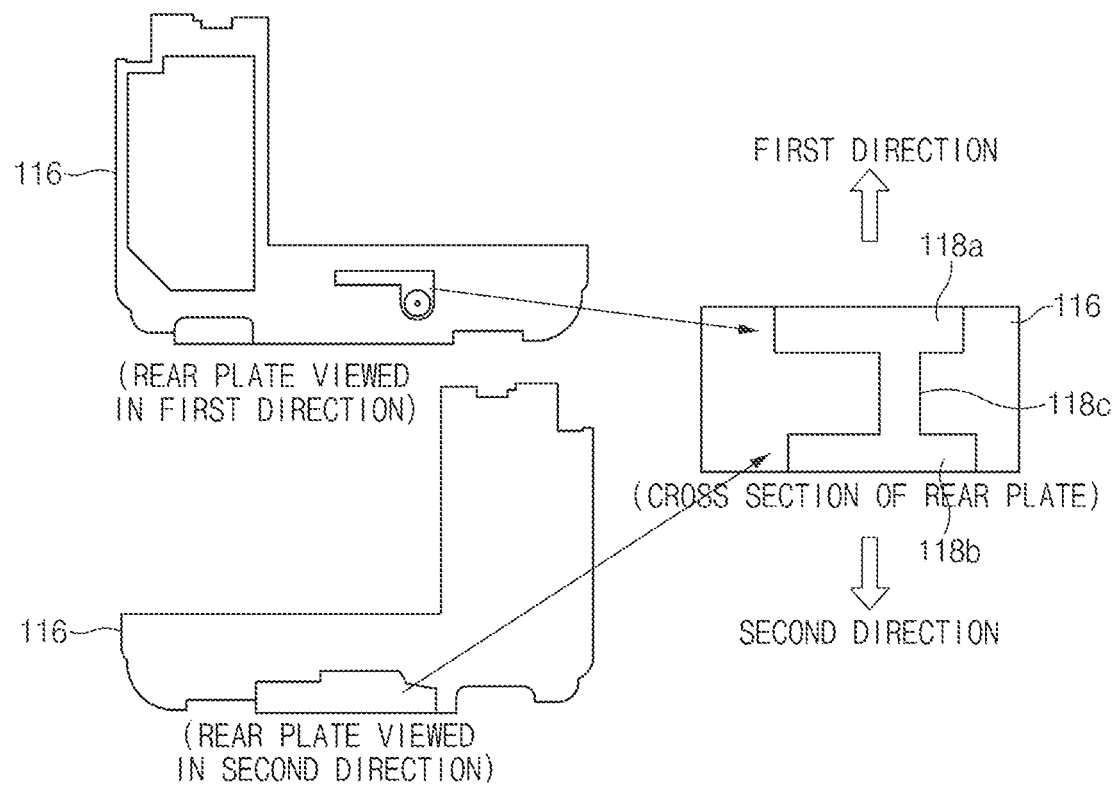
FIG. 3 illustrates a rear plate and a second antenna element mounted in the rear plate, according to an embodiment.

FIG. 2 illustrates a cross-sectional view of an electronic device, according to an embodiment. FIG. 3 illustrates a rear plate and a second antenna element mounted in the rear plate, according to an embodiment. In the disclosure, the description given with reference to FIG. 1 may be identically applied to components that have the same reference numerals/marks as those of the electronic device described with reference to FIG. 1.

Referring to FIG. 2, a housing may include the side housing 110a and the rear housing 110b. The side housing 110a may be disposed on the side of the electronic device to protect internal components of the electronic device. According to an embodiment, the side housing 110a may include a metal area and a non-metal area. The metal area that is an area disposed on an outer surface of the electronic device may be coupled with the rear housing 110b.

The rear housing 110b may be disposed on a rear surface of the electronic device to protect the internal components of the electronic device. According to an embodiment, the rear housing 110b may be formed of non-metal such that a signal generated from an antenna radiator may be radiated through the rear housing 110b. For example, the rear housing 110b may be formed of tempered glass, a plastic injection-molding material, or the like. The rear housing 110b may be integrally implemented with the side housing 110a or may be implemented to be removable from the electronic device. The rear housing 110b may be formed of metal, and a configuration, a position, etc. of the rear housing 110b are not limited to the above example.

In an embodiment, the housing of the electronic device 100 may include at least one or more components forming the exterior of the electronic device 100. For example, referring to FIG. 2, the housing may include the side housing 110a, the rear housing 110b, and the display 104. In another embodiment, the housing may include the cover glass 102, the side housing 110a, and the rear housing 110b.

A first antenna element may include at least a portion of the housing. For example, the first antenna element may include at least a portion of the metal area included in the side housing 110a. The first antenna element may be electrically connected with a communication circuit disposed on a PCB. The communication circuit may supply a power to the first antenna element to transmit/receive a signal of a first frequency range.

A metal component 114 may be disposed adjacent to the first antenna element within the housing. The metal component 114 may be electrically connected to the PCB 108 and may be disposed on a surface of the PCB 108. The metal component 114 may be a component formed of metal among components mounted in the electronic device or a component having a metal shell for protecting the component. For example, the metal component 114 may include one or more of a USB connector 114a, an earphone connector 114b, and a microphone 114c.

A second antenna element 118 may be disposed adjacent to the metal component 114. For example, the second antenna element 118 may be interposed between the metal component 114 and the rear housing 110b. In an embodiment, the second antenna element 118 may be disposed in the non-metal area of the side housing 110a or may be disposed on a surface of the rear housing 110b. The second antenna element 118 may be disposed in a rear plate 116.

Referring to FIGS. 2 and 3, the rear plate 116 may be formed of a non-conductive material interposed between the metal component 114 and the rear housing 110b. For example, the rear plate 116 may be formed of a plastic injection molding material. The rear plate 116 may be included in an FPCB. For example, the rear plate 116 may be disposed in at least one or more layers of the FPCB composed of a plurality of layers. The rear plate 116 may be a conductive pattern on the FPCB or may be the lowermost layer of the FPCB.

In an embodiment, the rear plate 116 may include a first surface facing a first direction and a second surface facing a second direction that is opposite to the first direction. The first direction may be a direction facing the rear housing 110b, and the second direction may be a direction facing the PCB 108.

The second antenna element 118 may include a first conductive member 118a patterned on a first surface of the rear plate 116, a second conductive member 118b patterned on a second surface thereof, and a third conductive member 118c connecting the first conductive member 118a and the second conductive member 118b. The third conductive member 118c may penetrate the rear plate 116 to connect the first conductive member 118a and the second conductive member 118b.

According to an embodiment, the first conductive member 118a to the third conductive member 118c may be formed of the same material or may be formed of different materials. For example, the first conductive member 118a to the third conductive member 118c may be formed of a conductive material such as gold (Au), silver (Ag), copper (Cu), or graphite.

According to an embodiment, the first conductive member 118a may be patterned on the first surface, and the second conductive member 118b may be patterned on the second surface. For example, the second antenna element 118 may be formed in the rear plate 116 through a laser direct structuring (LDS) technique or a direct printing antenna (DPA) technique. The rear plate 116 may exist between the first conductive member 118a and the second conductive member 118b. The first conductive member 118a and the second conductive member 118b may be electrically connected with each other through a through hole formed in the rear plate 116.

Figure 4:
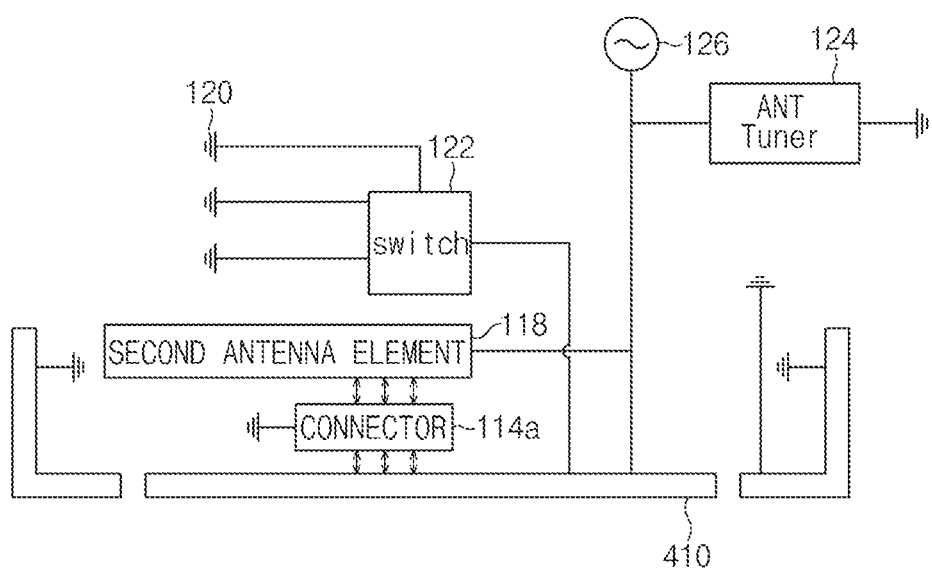
FIG. 4 illustrates a circuit diagram of an electronic device, according to an embodiment.

FIG. 4 illustrates a circuit diagram of an electronic device, according to an embodiment.

Referring to FIG. 4, the electronic device 100 may further include a ground part 120, a switch 122, a tuner 124, and a communication circuit 126.

The ground part 120 may be electrically connected with a first antenna element 410. According to an embodiment, the ground part 120 may be electrically connected with the first antenna element 410 through the switch 122. The switch 122 may change a position of the ground part 120, to which the first antenna element 410 is connected, and thus, an electrical length of the first antenna element 410 may change. As the electrical length of the first antenna element 410 changes, a frequency band of a signal that may be transmitted/received through the first antenna element 410 may change.

According to an embodiment, the ground part 120 may be electrically connected with at least one of the first antenna element 410 and the second antenna element 118. For example, the ground part 120 may be connected to the first antenna element 410 and/or the second antenna element 118 through the switch 122. The switch 122 may change a position of the ground part 120, to which the first antenna element 410 and the second antenna element 118 are connected, and thus, an electrical length of the first antenna element 410 and the second antenna element 118 may change. As the electrical length of the first antenna element 410 and the second antenna element 118 changes, a frequency band of a signal that may be transmitted/received through the first antenna element 410 and the second antenna element 118 may change.

The tuner 124 may control an impedance corresponding to the first antenna element 410 to finely tune a frequency band at which the first antenna element 410 resonates or to improve the efficiency of resonance. Also, the tuner 124 may control an impedance corresponding to the second antenna element 118 to finely tune a frequency band at which the second antenna element 118 resonates or to improve the efficiency of resonance.

The communication circuit 126 may be disposed in the PCB 108 and may supply a power to the first antenna element 410 and the second antenna element 118. When the communication circuit 126 supplies a power to the first antenna element 410, the metal component 114 (e.g., the connector 114a) and the first antenna element 410 may be electrically connected by the coupling. When the communication circuit 126 supplies a power to the second antenna element 118, the metal component 114 (e.g., the connector 114a) and the second antenna element 118 may be electrically connected by the coupling. When each of the first antenna element 410 and the second antenna element 118 is electrically connected with the metal component 114, the communication circuit 126 may indirectly supply a power to the metal component 114 through at least one of the first antenna element 410 and the second antenna element 118. According to an embodiment, when the power is indirectly supplied to the metal component 114, the metal component 114 may operate as an antenna radiator or a portion of an antenna radiator.

For example, because the second antenna element 118 is disposed adjacent to the metal component 114, an electrical component that is radiated from the first antenna element 410 and is induced at the metal component 114 may be radiated to the outside of the electronic device 100 through the second antenna element 118 and vice versa. That is, in a conventional electronic device, an electrical signal is induced at the metal component 114, and thus, the signal fails to be smoothly radiated to the outside of the electronic device. Because the signal is not smoothly radiated to the outside of the electronic device, the performance of antenna is reduced. However, in the disclosure, the reduction of performance of an antenna may be prevented by utilizing the metal component 114 as a portion of an electrical path for antenna radiation. Also, in the disclosure, the efficiency of antenna may increase, and an additional frequency band may be secured.

The communication circuit 126 may transmit/receive a signal in a specified frequency band through an electrical path that is formed by the first antenna element 410, the second antenna element 118, and the metal component 114.

The electrical path may be formed through the first antenna element 410, the metal component 114, and the second antenna element 118, or may be formed through the first antenna element 410. The electrical path is not limited to the example illustrated in FIG. 4.

According to an embodiment, the communication circuit 126 may change an electrical path to change a frequency band for transmitting/receiving a signal. For example, the communication circuit 126 may transmit/receive a signal in a first frequency band through the first antenna element 410. The communication circuit 126 may transmit/receive a signal in a second frequency band through the first antenna element 410, the metal component 114, and the second antenna element 118. Also, the communication circuit 126 may transmit/receive a signal in a third frequency band through the second antenna element 118.

According to an embodiment, the metal component 114 may be the connector 114a. When the communication circuit 126 supplies a power to the first antenna element 410, the first antenna element 410 and the connector 114a may be electrically connected by the coupling. When the first antenna element 410 and the connector 114a are electrically connected, the connector 114a may operate as an antenna radiator or a portion of a radiator. When the connector 114a operates as an antenna radiator, the connector 114a and the second antenna element 118 may be electrically connected by the coupling.

According to an embodiment, the communication circuit 126 may supply a power to the second antenna element 118. When the power is supplied to the second antenna element 118, the second antenna element 118 and the connector 114a may be electrically connected by the coupling. The connector 114a may operate as an antenna radiator or a portion of a radiator. When the connector 114a operates as an antenna radiator, the connector 114a and the first antenna element 410 may be electrically connected by the coupling. According to the disclosure, a communication circuit may change an electrical path between the first antenna element 410, the second antenna element 118, and the connector 114a to change a frequency band for transmitting/receiving a signal.

According to an embodiment, at least one of the first antenna element 410 and the second antenna element 118 may be electrically connected with the ground part 120 through the switch 122. For example, the switch 122 may change a position of the ground part 120, to which the first antenna element 410 and the second antenna element 118 are connected, and thus, an electrical length of the first antenna element 410 and the second antenna element 118 may change. As the electrical length of the first antenna element 410 and the second antenna element 118 changes, a frequency band of a signal that may be transmitted/received through the first antenna element 410 and the second antenna element 118 may change.

According to an embodiment, the electronic device may further include a switch (not illustrated) interposed between the second antenna element 118 and the communication circuit 126. The switch interposed between the second antenna element 118 and the communication circuit 126 may be turned on or off according to whether the connector 114a is connected with an external device or whether the external device approaches to the connector 114a. For example, when the external device is connected with the connector 114a or when the external device approaches the connector 114a, the switch may be turned on, and thus, the second antenna element 118 and the communication circuit 126 may be connected. When the external device and the connector 114a are disconnected, the switch may be turned off, and thus, the second antenna element 118 and the communication circuit 126 may be disconnected. Whether the external device is connected to the connector 114a or whether the external device approaches may be determined by a processor. The processor may determine whether a signal is introduced to the connector 114a or may determine whether an inductance of the connector 114a changes. The processor may determine whether the external device is connected or whether the external device approaches, based on a result of determining whether the signal is introduced to the connector 114a or whether the inductance of the connector 114a changes.

Figure 5A:
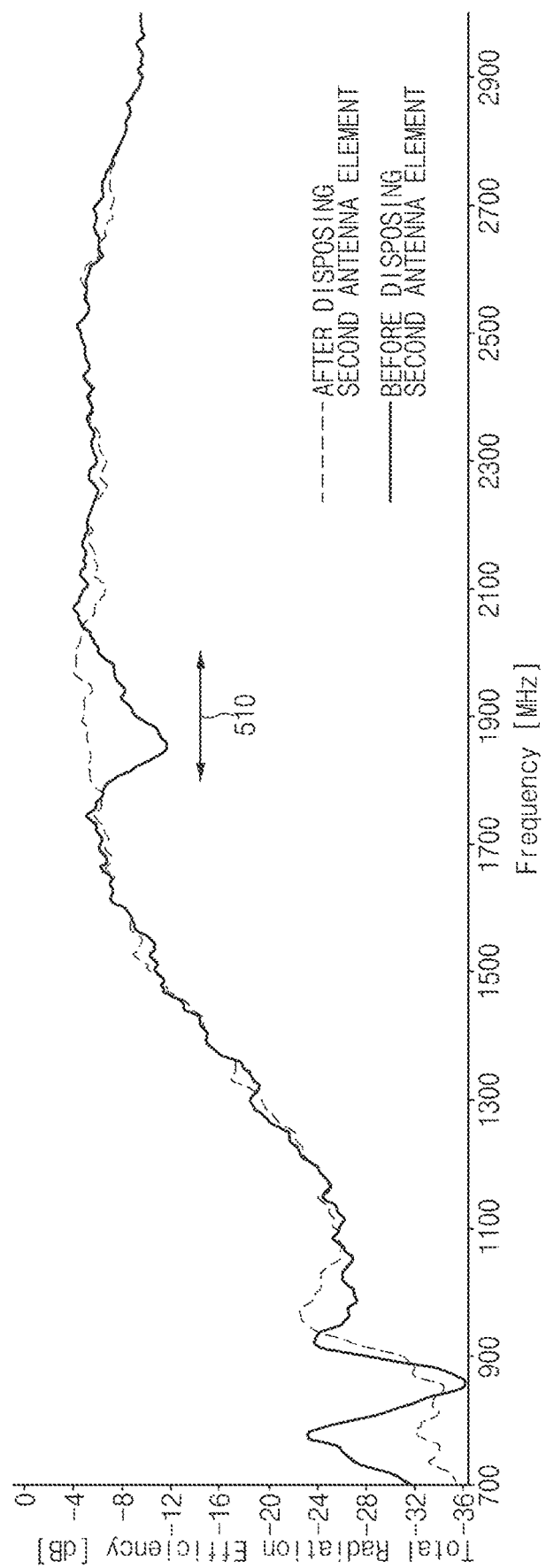
FIG. 5A illustrates a radiation efficiency of an electronic device, according to an embodiment.
Figure 5B:
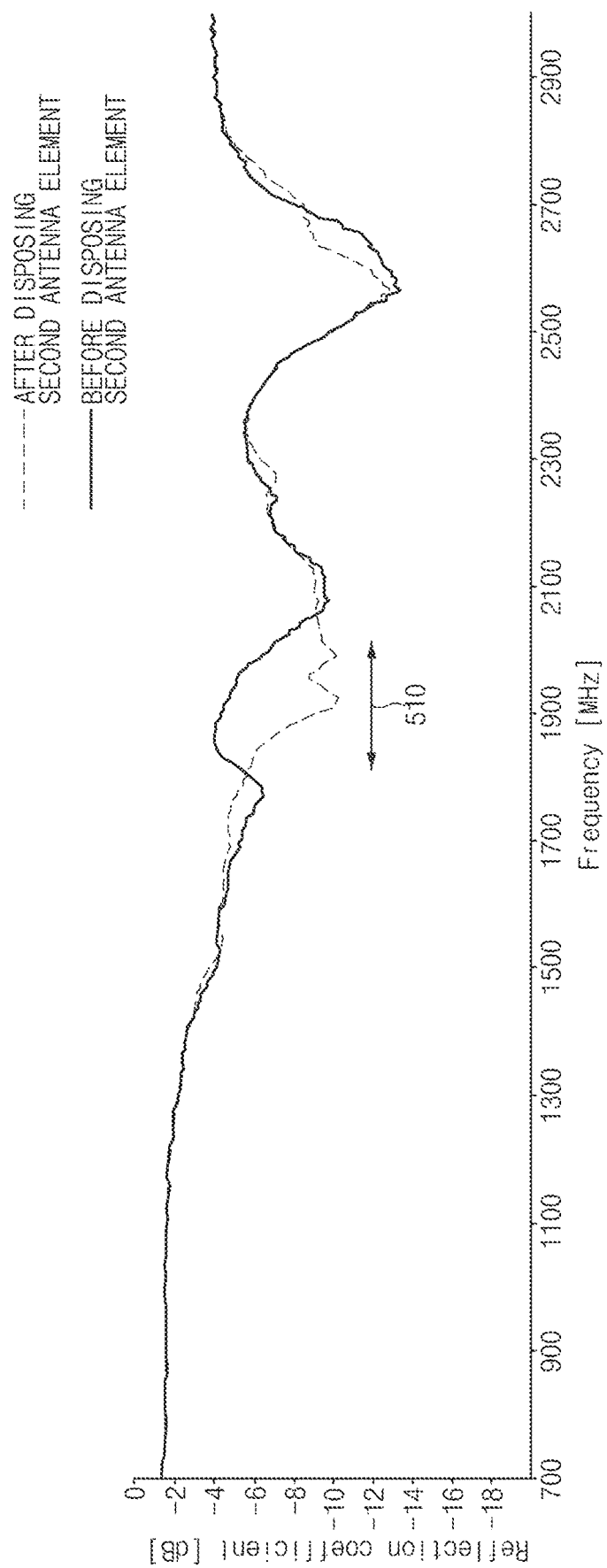
FIG. 5B illustrates a reflection coefficient of an electronic device, according to an embodiment.

FIG. 5A illustrates a radiation efficiency of an electronic device, according to an embodiment. FIG. 5B illustrates a reflection coefficient of an electronic device, according to an embodiment.

Referring to FIG. 5A, in the case where the second antenna element 118 is disposed adjacent to the metal component 114, the radiation efficiency of the first antenna element 410 and the second antenna element 118 in a band 510 may increase. Because the metal component 114 is formed of a conductive material, the first antenna element 410 and the metal component 114 may be electrically connected by the coupling. The second antenna element 118 and the metal component 114 may also be electrically connected by the coupling. When an electrical connection between the first antenna element 410 and the metal component 114 and an electrical connection between the second antenna element 118 and the metal component 114 are made, the first antenna element 410 and the second antenna element 118 may also be electrically connected. When the first antenna element 410 and the second antenna element 118 are electrically connected, various electrical paths may be formed through the first antenna element 410, the second antenna element 118, and the metal component 114, and thus, a radiation efficiency may increase. Unlike the above example, the second antenna element 118 and the metal component 114 may be electrically connected, and the metal component 114 and the first antenna element 410 may be electrically connected. When an electrical connection between the second antenna element 118 and the metal component 114 and an electrical connection between the metal component 114 and the first antenna element 410 are made, the second antenna element 118 and the first antenna element 410 may also be electrically connected.

Referring to FIG. 5B, in the case where the second antenna element 118 is disposed adjacent to the metal component 114, the reflection coefficient in the band 510 may decrease. Because the reflection coefficient in the band 510 decreases, an electronic device may transmit/receive more signals, and the performance of the antenna elements 410 and 118 may be improved. An example is illustrated in FIGS. 5A and 5B as the frequency band 510 at which the antenna elements 410 and 118 resonate ranges from 1800 MHz to 1900 MHz, but a resonant frequency band may be changed by the switch 122 or the tuner 124 described with reference to FIG. 4.

Figure 6:
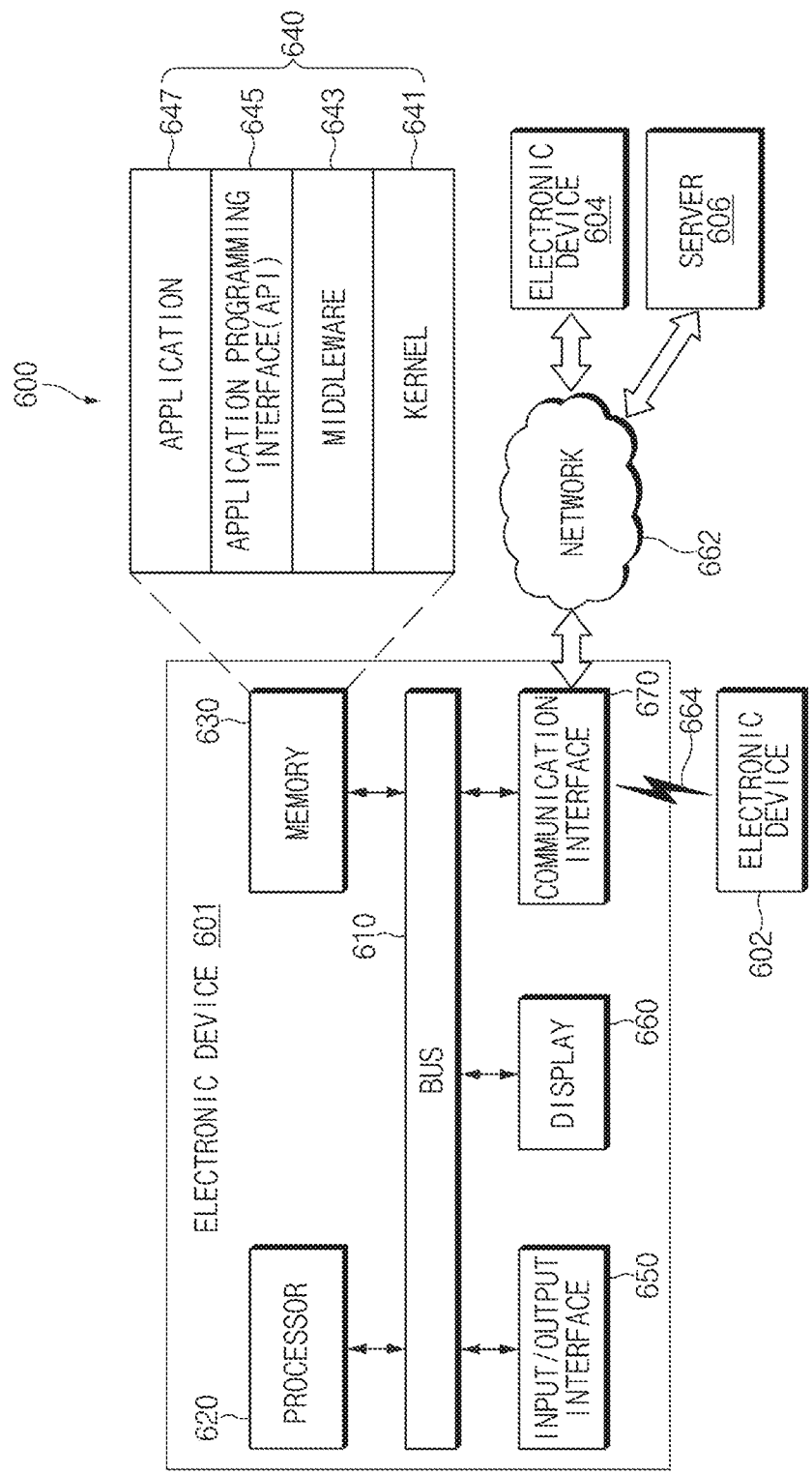
FIG. 6 illustrates an electronic device in a network environment according to an embodiment.

FIG. 6 illustrates an electronic device in a network environment system, according to an embodiment.

Referring to FIG. 6, according to an embodiment, an electronic device 601, a first electronic device 602, a second electronic device 604, or a server 606 may be connected each other over a network 662 or a short range communication 664. The electronic device 601 may include a bus 610, a processor 620, a memory 630, an input/output interface 650, a display 660, and a communication interface 670. According to an embodiment, the electronic device 601 may not include at least one of the above-described components or may further include other component(s).

For example, the bus 610 may interconnect the above-described components 610 to 670 and may include a circuit for conveying communications (e.g., a control message and/or data) among the above-described components.

The processor 620 may include one or more of a central processing unit (CPU), an application processor (AP), or a communication processor (CP). For example, the processor 620 may perform an arithmetic operation or data processing associated with control and/or communication of at least other components of the electronic device 601.

The memory 630 may include a volatile and/or nonvolatile memory. For example, the memory 630 may store commands or data associated with at least one other component(s) of the electronic device 601. According to an embodiment, the memory 630 may store software and/or a program 640. The program 640 may include, for example, a kernel 641, a middleware 643, an application programming interface (API) 645, and/or an application program (or "an application") 647. At least a part of the kernel 641, the middleware 643, or the API 645 may be referred to as an "operating system (OS)".

For example, the kernel 641 may control or manage system resources (e.g., the bus 610, the processor 620, the memory 630, and the like) that are used to execute operations or functions of other programs (e.g., the middleware 643, the API 645, and the application program 647). Furthermore, the kernel 641 may provide an interface that allows the middleware 643, the API 645, or the application program 647 to access discrete components of the electronic device 601 so as to control or manage system resources.

The middleware 643 may perform, for example, a mediation role such that the API 645 or the application program 647 communicates with the kernel 641 to exchange data.

Furthermore, the middleware 643 may process task requests received from the application program 647 according to a priority. For example, the middleware 643 may assign the priority, which makes it possible to use a system resource (e.g., the bus 610, the processor 620, the memory 630, or the like) of the electronic device 601, to at least one of the application program 647. For example, the middleware 643 may process the one or more task requests according to the priority assigned to the at least one, which makes it possible to perform scheduling or load balancing on the one or more task requests.

The API 645 may be, for example, an interface through which the application program 647 controls a function provided by the kernel 641 or the middleware 643, and may include, for example, at least one interface or function (e.g., an instruction) for a file control, a window control, image processing, a character control, or the like.

The input/output interface 650 may play a role, for example, of an interface which transmits a command or data input from a user or another external device, to other component(s) of the electronic device 601. Furthermore, the input/output interface 650 may output a command or data, received from other component(s) of the electronic device 601, to a user or another external device.

The display 660 may include, for example, a liquid crystal display (LCD), a light-emitting diode (LED) display, an organic LED (OLED) display, a microelectromechanical systems (MEMS) display, or an electronic paper display. The display 660 may display, for example, various contents (e.g., a text, an image, a video, an icon, a symbol, and the like) to a user. The display 660 may include a touch screen and may receive, for example, a touch, gesture, proximity, or hovering input using an electronic pen or a part of a user's body.

For example, the communication interface 670 may establish communication between the electronic device 601 and an external device (e.g., the first electronic device 602, the second electronic device 604, or the server 606). For example, the communication interface 670 may be connected to the network 662 over wireless communication or wired communication to communicate with the external device (e.g., the second electronic device 604 or the server 606).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 664. The short range communication 664 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 601 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the present disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 662 may include at least one of telecommunications networks, for example, a computer network (e.g., LAN or WAN), an Internet, or a telephone network.

Each of the first and second electronic devices 602 and 604 may be a device of which the type is different from or the same as that of the electronic device 601. According to an embodiment, the server 606 may include a group of one or more servers. According to an embodiment, all or a portion of operations that the electronic device 601 will perform may be executed by another or plural electronic devices (e.g., the first electronic device 602, the second electronic device 604 or the server 606). According to an embodiment, in the case where the electronic device 601 executes any function or service automatically or in response to a request, the electronic device 601 may not perform the function or the service internally, but, alternatively additionally, it may request at least a portion of a function associated with the electronic device 601 from another device (e.g., the electronic device 602 or 604 or the server 606). The other electronic device may execute the requested function or additional function and may transmit the execution result to the electronic device 601. The electronic device 601 may provide the requested function or service using the received result or may additionally process the received result to provide the requested function or service. To this end, for example, cloud computing, distributed computing, or client-server computing may be used.

Figure 7:
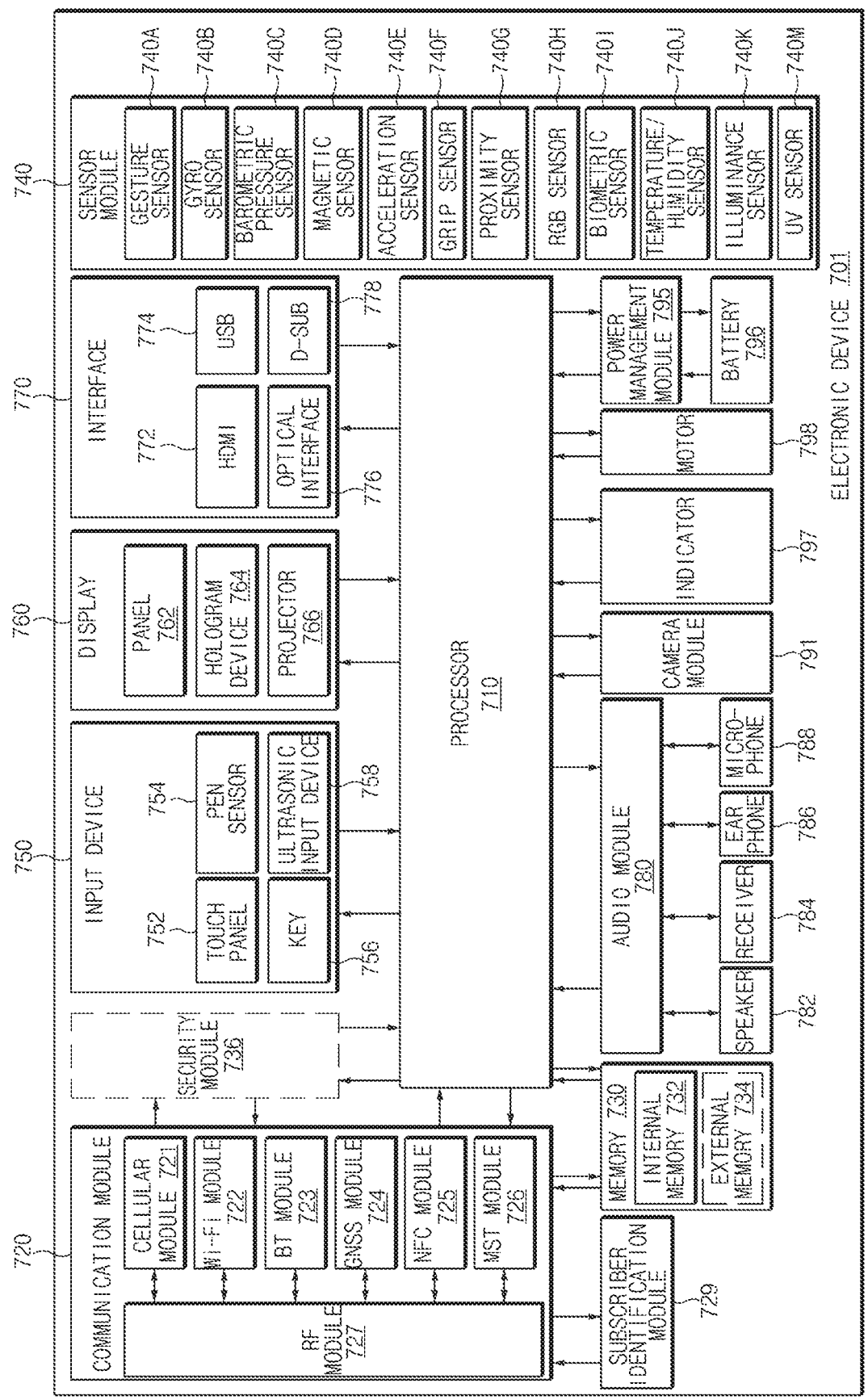
FIG. 7 illustrates a block diagram of an electronic device according to an embodiment.

FIG. 7 illustrates a block diagram of an electronic device, according to an embodiment.

Referring to FIG. 7, an electronic device 701 may include, for example, all or a part of the electronic device 601 illustrated in FIG. 6. The electronic device 701 may include one or more processors (e.g., an application processor (AP)) 710, a communication module 720, a subscriber identification module 729, a memory 730, a sensor module 740, an input device 750, a display 760, an interface 770, an audio module 780, a camera module 791, a power management module 795, a battery 796, an indicator 797, and a motor 798.

The processor 710 may drive, for example, an operating system (OS) or an application to control a plurality of hardware or software components connected to the processor 710 and may process and compute a variety of data. For example, the processor 710 may be implemented with a System on Chip (SoC). According to an embodiment, the processor 710 may further include a graphic processing unit (GPU) and/or an image signal processor. The processor 710 may include at least a part (e.g., a cellular module 721) of components illustrated in FIG. 7. The processor 710 may load a command or data, which is received from at least one of other components (e.g., a nonvolatile memory), into a volatile memory and process the loaded command or data. The processor 710 may store a variety of data in the nonvolatile memory.

The communication module 720 may be configured the same as or similar to the communication interface 670 of FIG. 6. The communication module 720 may include the cellular module 721, a Wi-Fi module 722, a Bluetooth (BT) module 723, a GNSS module 724 (e.g., a GPS module, a Glonass module, a Beidou module, or a Galileo module), a near field communication (NFC) module 725, a MST module 726 and a radio frequency (RF) module 727.

The cellular module 721 may provide, for example, voice communication, video communication, a character service, an Internet service, or the like over a communication network. According to an embodiment, the cellular module 721 may perform discrimination and authentication of the electronic device 701 within a communication network by using the subscriber identification module (e.g., a SIM card) 729. According to an embodiment, the cellular module 721 may perform at least a portion of functions that the processor 710 provides. According to an embodiment, the cellular module 721 may include a communication processor (CP).

Each of the Wi-Fi module 722, the BT module 723, the GNSS module 724, the NFC module 725, or the MST module 726 may include a processor for processing data exchanged through a corresponding module, for example. According to an embodiment, at least a part (e.g., two or more) of the cellular module 721, the Wi-Fi module 722, the BT module 723, the GNSS module 724, the NFC module 725, or the MST module 726 may be included within one Integrated Circuit (IC) or an IC package.

For example, the RF module 727 may transmit and receive a communication signal (e.g., an RF signal). For example, the RF module 727 may include a transceiver, a power amplifier module (PAM), a frequency filter, a low noise amplifier (LNA), an antenna, or the like. According to another embodiment, at least one of the cellular module 721, the Wi-Fi module 722, the BT module 723, the GNSS module 724, the NFC module 725, or the MST module 726 may transmit and receive an RF signal through a separate RF module.

The subscriber identification module 729 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 730 (e.g., the memory 630) may include an internal memory 732 or an external memory 734. For example, the internal memory 732 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 734 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 734 may be operatively and/or physically connected to the electronic device 701 through various interfaces.

A security module 736 may be a module that includes a storage space of which a security level is higher than that of the memory 730 and may be a circuit that guarantees safe data storage and a protected execution environment. The security module 736 may be implemented with a separate circuit and may include a separate processor. For example, the security module 736 may be in a smart chip or a secure digital (SD) card, which is removable, or may include an embedded secure element (eSE) embedded in a fixed chip of the electronic device 701. Furthermore, the security module 736 may operate based on an operating system (OS) that is different from the OS of the electronic device 701. For example, the security module 736 may operate based on java card open platform (JCOP) OS.

The sensor module 740 may measure, for example, a physical quantity or may detect an operation state of the electronic device 701. The sensor module 740 may convert the measured or detected information to an electric signal. For example, the sensor module 740 may include at least one of a gesture sensor 740A, a gyro sensor 740B, a barometric pressure sensor 740C, a magnetic sensor 740D, an acceleration sensor 740E, a grip sensor 740F, the proximity sensor 740G, a color sensor 740H (e.g., red, green, blue (RGB) sensor), a biometric sensor 740I, a temperature/humidity sensor 740J, an illuminance sensor 740K, or an UV sensor 740M. Although not illustrated, additionally or alternatively, the sensor module 740 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 740 may further include a control circuit for controlling at least one or more sensors included therein. According to an embodiment, the electronic device 701 may further include a processor that is a part of the processor 710 or independent of the processor 710 and is configured to control the sensor module 740. The processor may control the sensor module 740 while the processor 710 remains at a sleep state.

The input device 750 may include, for example, a touch panel 752, a (digital) pen sensor 754, a key 756, or an ultrasonic input unit 758. For example, the touch panel 752 may use at least one of capacitive, resistive, infrared and ultrasonic detecting methods. Also, the touch panel 752 may further include a control circuit. The touch panel 752 may further include a tactile layer to provide a tactile reaction to a user.

The (digital) pen sensor 754 may be, for example, a part of a touch panel or may include an additional sheet for recognition. The key 756 may include, for example, a physical button, an optical key, a keypad, or the like. The ultrasonic input device 758 may detect (or sense) an ultrasonic signal, which is generated from an input device, through a microphone (e.g., a microphone 788) and may check data corresponding to the detected ultrasonic signal.

The display 760 (e.g., the display 660) may include a panel 762, a hologram device 764, or a projector 766. The panel 762 may be the same as or similar to the display 660 illustrated in FIG. 6. The panel 762 may be implemented, for example, to be flexible, transparent or wearable. The panel 762 and the touch panel 752 may be integrated into a single module. The hologram device 764 may display a stereoscopic image in a space using a light interference phenomenon. The projector 766 may project light onto a screen so as to display an image. For example, the screen may be arranged in the inside or the outside of the electronic device 701. According to an embodiment, the display 760 may further include a control circuit for controlling the panel 762, the hologram device 764, or the projector 766.

The interface 770 may include, for example, a high-definition multimedia interface (HDMI) 772, a universal serial bus (USB) 774, an optical interface 776, or a D-subminiature (D-sub) 778. The interface 770 may be included, for example, in the communication interface 670 illustrated in FIG. 6. Additionally or alternatively, the interface 770 may include, for example, a mobile high definition link (MHL) interface, a SD card/multi-media card (MMC) interface, or an infrared data association (IrDA) standard interface.

The audio module 780 may convert a sound and an electric signal in dual directions. At least a component of the audio module 780 may be included, for example, in the input/output interface 650 illustrated in FIG. 6. The audio module 780 may process, for example, sound information that is input or output through a speaker 782, a receiver 784, an earphone 786, or the microphone 788.

For example, the camera module 791 may shoot a still image or a video. According to an embodiment, the camera module 791 may include at least one or more image sensors (e.g., a front sensor or a rear sensor), a lens, an image signal processor (ISP), or a flash (e.g., an LED or a xenon lamp).

The power management module 795 may manage, for example, power of the electronic device 701. According to an embodiment, a power management integrated circuit (PMIC), a charger IC, or a battery or fuel gauge may be included in the power management module 795. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 796 and a voltage, current or temperature thereof while the battery is charged. The battery 796 may include, for example, a rechargeable battery and/or a solar battery.

The indicator 797 may display a specific state of the electronic device 701 or a part thereof (e.g., the processor 710), such as a booting state, a message state, a charging state, and the like. The motor 798 may convert an electrical signal into a mechanical vibration and may generate the following effects: vibration, haptic, and the like. Although not illustrated, a processing device (e.g., a GPU) for supporting a mobile TV may be included in the electronic device 701. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the present disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 8:
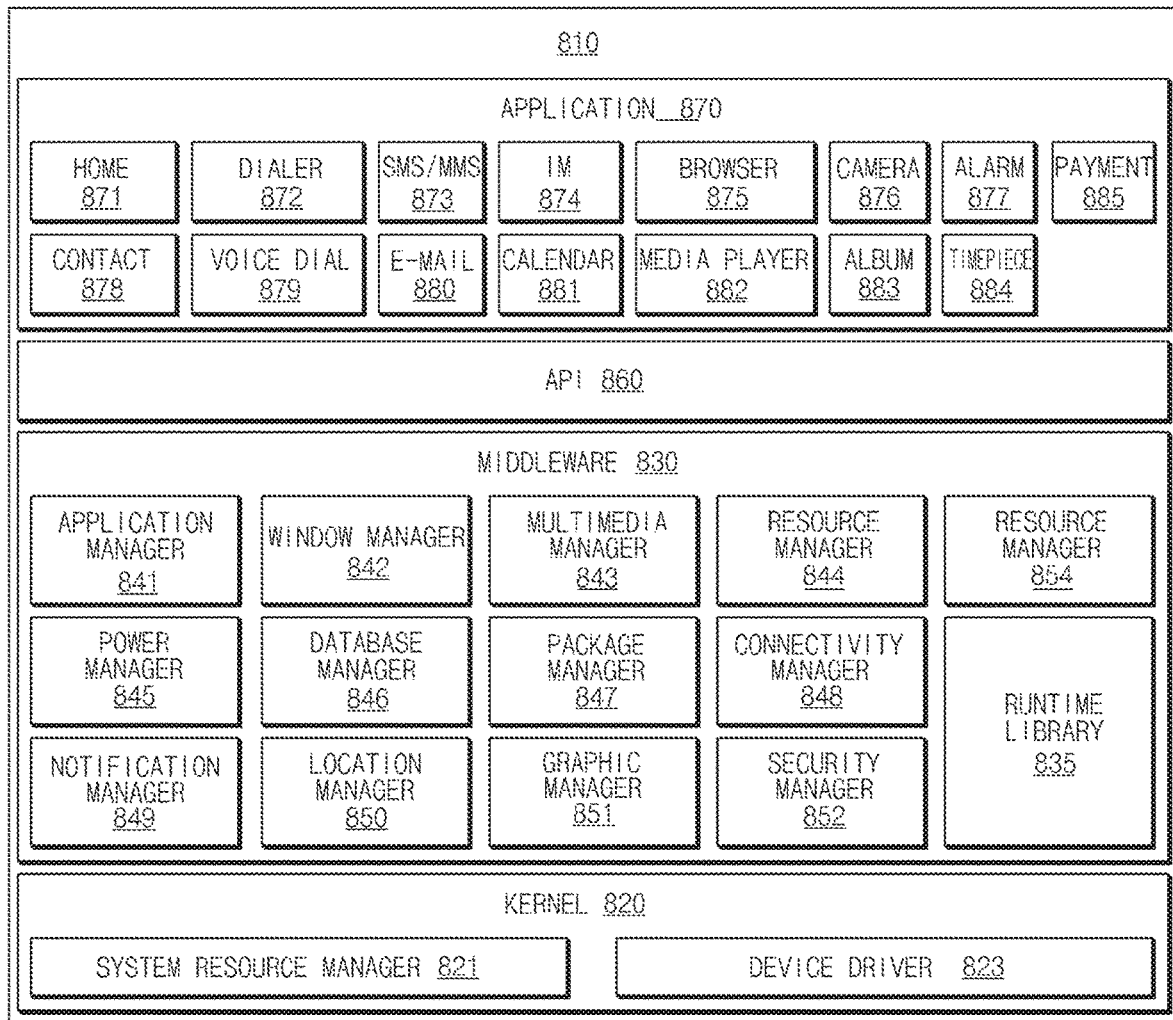
FIG. 8 illustrates a block diagram of a program module according to an embodiment.

FIG. 8 illustrates a block diagram of a program module, according to various embodiments.

According to an embodiment, a program module 810 (e.g., the program 640) may include an operating system (OS) to control resources associated with an electronic device (e.g., the electronic device 601), and/or diverse applications (e.g., the application program 647) driven on the OS. The OS may be, for example, Android™, iOS™ Windows™, Symbian™, or Tizen™.

The program module 810 may include a kernel 820, a middleware 830, an application programming interface (API) 860, and/or an application 870. At least a portion of the program module 810 may be preloaded on an electronic device or may be downloadable from an external electronic device (e.g., the first electronic device 602, the second electronic device 604, the server 606, or the like).

The kernel 820 (e.g., the kernel 641) may include, for example, a system resource manager 821 or a device driver 823. The system resource manager 821 may perform control, allocation, or retrieval of system resources. According to an embodiment, the system resource manager 821 may include a process managing unit, a memory managing unit, or a file system managing unit. The device driver 823 may include, for example, a display driver, a camera driver, a Bluetooth driver, a shared memory driver, a USB driver, a keypad driver, a Wi-Fi driver, an audio driver, or an inter-process communication (IPC) driver.

The middleware 830 may provide, for example, a function that the application 870 needs in common, or may provide diverse functions to the application 870 through the API 860 to allow the application 870 to efficiently use limited system resources of the electronic device. According to an embodiment, the middleware 830 (e.g., the middleware 643) may include at least one of a runtime library 835, an application manager 841, a window manager 842, a multimedia manager 843, a resource manager 844, a power manager 845, a database manager 846, a package manager 847, a connectivity manager 848, a notification manager 849, a location manager 850, a graphic manager 851, a security manager 852, or a payment manager 854.

The runtime library 835 may include, for example, a library module that is used by a compiler to add a new function through a programming language while the application 870 is being executed. The runtime library 835 may perform input/output management, memory management, or capacities about arithmetic functions.

The application manager 841 may manage, for example, a life cycle of at least one application of the application 870. The window manager 842 may manage a graphic user interface (GUI) resource that is used in a screen. The multimedia manager 843 may identify a format necessary for playing diverse media files, and may perform encoding or decoding of media files by using a codec suitable for the format. The resource manager 844 may manage resources such as a storage space, memory, or source code of at least one application of the application 870.

The power manager 845 may operate, for example, with a basic input/output system (BIOS) to manage a battery or power, and may provide power information for an operation of an electronic device. The database manager 846 may generate, search for, or modify database that is to be used in at least one application of the application 870. The package manager 847 may install or update an application that is distributed in the form of package file.

The connectivity manager 848 may manage, for example, wireless connection such as Wi-Fi or Bluetooth. The notification manager 849 may display or notify an event such as arrival message, appointment, or proximity notification in a mode that does not disturb a user. The location manager 850 may manage location information about an electronic device. The graphic manager 851 may manage a graphic effect that is provided to a user, or manage a user interface relevant thereto. The security manager 852 may provide a general security function necessary for system security, user authentication, or the like. According to an embodiment, in the case where an electronic device (e.g., the electronic device 601) includes a telephony function, the middleware 830 may further include a telephony manager for managing a voice or video call function of the electronic device.

The middleware 830 may include a middleware module that combines diverse functions of the above-described components. The middleware 830 may provide a module specialized to each OS kind to provide differentiated functions. Additionally, the middleware 830 may dynamically remove a part of the preexisting components or may add new components thereto.

The API 860 (e.g., the API 645) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 870 (e.g., the application program 647) may include, for example, one or more applications capable of providing functions for a home 871, a dialer 872, an SMS/MMS 873, an instant message (IM) 874, a browser 875, a camera 876, an alarm 877, a contact 878, a voice dial 879, an e-mail 880, a calendar 881, a media player 882, an album 883, a timepiece 884, or for offering health care (e.g., measuring an exercise quantity, blood sugar, or the like) or environment information (e.g., information of barometric pressure, humidity, temperature, or the like).

According to an embodiment, the application 870 may include an application (hereinafter referred to as "information exchanging application" for descriptive convenience) to support information exchange between an electronic device (e.g., the electronic device 601) and an external electronic device (e.g., the first electronic device 602 or the second electronic device 604). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 870 may include an application (e.g., a health care application of a mobile medical device) that is assigned in accordance with an attribute of an external electronic device. According to an embodiment, the application 870 may include an application that is received from an external electronic device (e.g., the first electronic device 602, the second electronic device 604, or the server 606). According to an embodiment, the application 870 may include a preloaded application or a third party application that is downloadable from a server. The names of components of the program module 810 according to the embodiment may be modifiable depending on kinds of operating systems.

According to an embodiment, at least a portion of the program module 810 may be implemented by software, firmware, hardware, or a combination of two or more thereof. At least a portion of the program module 810 may be implemented (e.g., executed), for example, by the processor (e.g., the processor 710). At least a portion of the program module 810 may include, for example, modules, programs, routines, sets of instructions, processes, or the like for performing one or more functions.

The term "module" used in the present disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to an embodiment may be, for example, implemented by instructions stored in a computer-readable storage media in the form of a program module. The instruction, when executed by a processor (e.g., the processor 620), may cause the one or more processors to perform a function corresponding to the instruction. The computer-readable storage media, for example, may be the memory 630.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   a first antenna element including at least a portion of a housing;
   a metal component disposed adjacent to the first antenna element within the housing;
   a rear plate interposed between the metal component and the housing, wherein the rear plate includes a first surface facing a first direction and a second surface facing a second direction that is opposite to the first direction;
   a second antenna element disposed in the rear plate adjacent to the metal component, wherein the second antennal element includes;
     a first conductive member patterned on the first surface;
     a second conductive member patterned on the second surface, and
     a third conductive member penetrating the rear plate to connect the first conductive member and the second conductive member; and
   a communication circuit configured to supply a power to the first antenna element and the second antenna element,
   wherein the communication circuit indirectly supplies a power to the metal component through at least one of the first antenna element and the second antenna element, and
   wherein the communication circuit transmits/receives a signal in a specified frequency band through an electrical path that is formed by the first antenna element, the second antenna element, and the metal component.

2. The electronic device of claim 1, wherein the metal component is electrically connected with the first antenna element or the second antenna element by a coupling.

3. The electronic device of claim 1, further comprising:
   a switch interposed between the second antenna element and the communication circuit and turned on or turned off according to whether the metal component and an external device are connected.

4. The electronic device of claim 1, further comprising:
   a ground part electrically connected with the first antenna element.

5. The electronic device of claim 4, wherein the ground part is electrically connected with the first antenna element through a switch.

6. The electronic device of claim 1, further comprising:
   a tuner configured to control an impedance corresponding to the first antenna element or an impedance corresponding to the second antenna element.

7. The electronic device of claim 1, further comprising:
   a printed circuit board (PCB) on which the communication circuit is mounted,
   wherein the metal component is electrically connected with the PCB.

8. The electronic device of claim 1, wherein at least a portion of the housing is formed of a plastic injection-molding material such that the signal is transmitted/received.

9. The electronic device of claim 1, wherein the metal component corresponds to any one of a USB connector, an earphone connector, and a microphone.

10. An electronic device comprising:
    a first antenna element including at least a portion of a housing;
    a metal component disposed adjacent to the first antenna element within the housing;
    a rear plate interposed between the metal component and the housing, wherein the rear plate includes a first surface facing a first direction and a second surface facing a second direction that is opposite to the first direction,
    a second antenna element disposed in the rear plate adjacent to the metal component, wherein the second antenna elements includes,
      a first conductive member patterned on the first surface;
      a second conductive member patterned on the second surface, and
      a third conductive member penetrating the rear plate to connect the first conductive member and the second conductive member; and
    a communication circuit configured to supply a power to the first antenna element and the second antenna element,
    wherein the communication circuit is configured to:
    indirectly supply a power to the metal component through at least one of the first antenna element and the second antenna element;
    transmit/receive a signal in a first frequency band through an electrical path that is formed by the first antenna element, the second antenna element, and the metal component; and
    change the electrical path to transmit/receive a signal of a second frequency band.

11. The electronic device of claim 10, wherein the second frequency band is higher than the first frequency band.

12. The electronic device of claim 10, wherein the metal component and the first antenna element are electrically connected by a coupling.

13. The electronic device of claim 10, wherein the metal component and the second antenna element are electrically connected by a coupling.

* * * * *